(12) United States Patent
Kitaoka et al.

(10) Patent No.: US 8,403,579 B2
(45) Date of Patent: Mar. 26, 2013

(54) WATER-BASED INK COMPOSITION FOR BALLPOINT PENS

(75) Inventors: Nobuyuki Kitaoka, Nagoya (JP); Yoshiaki Ono, Nagoya (JP)

(73) Assignee: The Pilot Ink Co., Ltd., Nagoya-Shi (JP)

( * ) Notice: Subject to any disclaimer, the term of this patent is extended or adjusted under 35 U.S.C. 154(b) by 330 days.

(21) Appl. No.: 12/733,695

(22) PCT Filed: Sep. 26, 2007

(86) PCT No.: PCT/JP2007/068603
§ 371 (c)(1),
(2), (4) Date: Mar. 16, 2010

(87) PCT Pub. No.: WO2009/040888
PCT Pub. Date: Apr. 2, 2009

(65) Prior Publication Data
US 2010/0232865 A1   Sep. 16, 2010

(51) Int. Cl.
*B43K 5/16* (2006.01)
*B43K 7/00* (2006.01)
(52) U.S. Cl. ........ 401/99; 401/209; 106/31.13; 524/543
(58) Field of Classification Search ............ 401/99, 401/209, 215; 106/31.13, 31.25, 31.68, 31.85, 106/31.86
See application file for complete search history.

(56) References Cited

U.S. PATENT DOCUMENTS

| | | | |
|---|---|---|---|
| 6,261,019 B1 * | 7/2001 | Furukawa | 401/223 |
| 6,325,845 B1 | 12/2001 | Kurihara et al. | |
| 6,458,192 B1 | 10/2002 | Tsujio | |
| 7,074,843 B2 * | 7/2006 | Nakamura et al. | 523/205 |
| 7,208,036 B2 * | 4/2007 | Fukuo et al. | 106/31.86 |
| 7,441,976 B2 * | 10/2008 | Kitaoka et al. | 401/209 |
| 2005/0124726 A1 * | 6/2005 | Yatake et al. | 523/160 |

FOREIGN PATENT DOCUMENTS

| | | |
|---|---|---|
| EP | 0818518 A2 | 1/1998 |
| JP | 59-074175 A | 4/1984 |
| JP | 10-077437 A | 3/1998 |
| JP | 10-279875 A | 10/1998 |
| JP | 2003-277671 A | 10/2003 |

(Continued)

OTHER PUBLICATIONS

International Search Report dated Jan. 8, 2008, issued on PCT/JP2007/068603.

(Continued)

*Primary Examiner* — David Walczak
*Assistant Examiner* — Jennifer C Chiang
(74) *Attorney, Agent, or Firm* — Edwards Wildman Palmer LLP; James E. Armstrong, IV; Weiying Yang

(57) ABSTRACT

A water-based ink composition for a ballpoint pen wherein the initial start of writing and writing over time is good, and no blur in handwriting occur and a stable writing performance can be sustained and good handwriting can be continuously formed. A water-based ink composition for a ballpoint pen dissolving or dispersing a coloring agent in an aqueous medium. The aqueous medium substantially contains no water-soluble organic solvent and is composed of water. The water-based ink composition includes a thickening inhibitor together with a shear thinning viscosity-imparting agent. As the thickening inhibitor, one or two or more are selected from a group of polyalkylene glycol, polypropylene glycol derivatives, polyvinyl alcohol, polyvinyl pyrrolidone, cellulose-based polymer compounds, polymer compounds having a polyalkylene oxide group and/or surfactants having a polyoxyethylene group.

15 Claims, 2 Drawing Sheets

FOREIGN PATENT DOCUMENTS

| | | |
|---|---|---|
| JP | 2004-026923 A | 1/2004 |
| JP | 2006-077074 A | 3/2006 |
| JP | 2007-521379 | 8/2007 |
| WO | WO-2005/010112 A1 | 2/2005 |

OTHER PUBLICATIONS

Extended European Search Report dated Jul. 9, 2012 issued in corresponding European Patent Application No. EP 07828376.

* cited by examiner

WATER-BASED INK COMPOSITION FOR BALLPOINT PENS

TECHNICAL FIELD

The present invention relates to a water-based ink composition for a ballpoint pen, and a refill for the ballpoint pen charged therewith and a ballpoint pen. In particular, the present invention is directed to enhancement of dry up resistance of a pen tip of the ballpoint pen.

A blending unit in the following description is a mass unit unless otherwise specified.

The dry up resistance refers to a performance where a "handwriting blur" with an increase in viscosity attributed to evaporation of a dispersion medium (solvent) hardly occurs.

BACKGROUND ART

In recent years, as an ink composition charged in a ballpoint pen, water-based ink compositions using an aqueous medium as a dispersion medium (water is a main solvent) are commonly used in consideration of environmental concerns and safety for humans. Among them, the water-based ink composition having a low viscosity solves handwriting bleeding by allowing to have a shear thinning viscosity.

A shear thinning viscosity-imparting agent includes polysaccharides such as xanthan gum (e.g., see Patent Document 1).

However, the shear thinning viscosity-imparting agent sometimes inhibits the dry up resistance. Therefore, in order to enhance the dry up resistance, an attempt has been made to combine additives such as a wetting agent, e.g., a water-soluble organic solvent and a solid wetting agent, e.g., urea with the shear thinning viscosity-imparting agent to suppress the drying.

However, it cannot be said that an effect of drying suppression is sufficient, and poor handwriting such as blur easily occur due to easy increases in the ink viscosity by the addition of the solid wetting agent.

Also, when the urea is added excessively, water is evaporated from a writing edge and a concentration of the water-soluble organic solvent is increased to precipitate a solid content at the writing edge. A so-called flower spot phenomenon, and the appearance worsens and occurrence of blur.

If the water-soluble organic solvent and the urea are added in large amounts, when the writing edge is left to stand facing downward in a humid environment, running occurs.

Although there are many procedures to enhance the dry up resistance in the ink composition as described above, these procedures sometimes have led to a reduction in other performances required for a ballpoint pen, e.g., handwriting blur and running have occurred.

Further, in the case of the ink composition charged and used in the ballpoint pen (retractable ballpoint pen) having a structure in which a ballpoint pen tip is always opened to the atmosphere when the ballpoint pen is not used for writing and requires no cap, the dry up resistance is particularly important.

Patent Document 1: Japanese Published Patent Application Sho-59-74175 A

DISCLOSURE OF INVENTION

Problem to be Solved by the Invention

The present invention solves the aforementioned problems of the ink compositions applied to ballpoint pens, that is, provides a water-based ink composition for a ballpoint pen, which satisfies the dry up resistance without inhibiting the various writing performances, and a refill for a ballpoint pen and the ballpoint pen charged therewith.

Means for Solving Problems

One aspect of the present invention is a water-based ink composition for a ballpoint pen wherein a coloring agent is dissolved or dispersed in an aqueous solvent and a thickening inhibitor is added together with a shear thinning viscosity-imparting agent, wherein the aqueous solvent is substantially composed of water as well as the thickening inhibitor is added together with the shear thinning viscosity-imparting agent, wherein the thickening inhibitor is composed of one or two or more selected from the group of compounds having a polyoxyethylene group and/or a polyoxypropylene group (including surfactants), polyvinyl pyrrolidone, polyvinyl alcohol and cellulose ether (including derivatives thereof), and wherein a dry up resistance is enhanced.

Another aspect of the present invention is a water-based ink composition for a ballpoint pen wherein a coloring agent is dissolved or dispersed in an aqueous solvent, wherein the aqueous solvent is substantially composed of water as well as a thickening inhibitor and an ionic substance are added together with a shear thinning viscosity-imparting agent, wherein the thickening inhibitor is composed of one or two or more selected from the group of compounds having a polyoxyethylene group and/or a polyoxypropylene group (including surfactants), polyvinyl pyrrolidone, polyvinyl alcohol and cellulose ether (including derivatives thereof), and wherein the dry up resistance is enhanced.

BEST MODES FOR CARRYING OUT THE INVENTION

Figure 1:
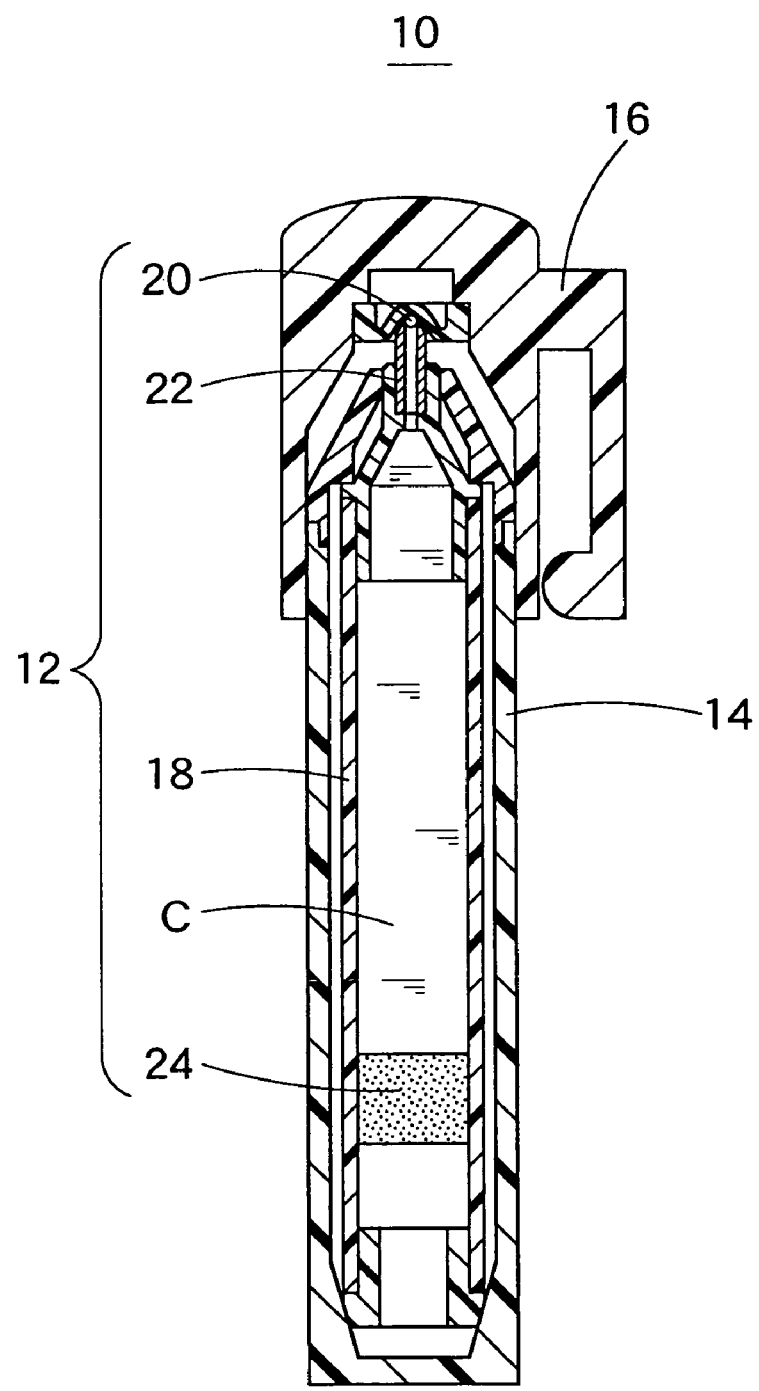
FIG. 1 is a vertical cross sectional view showing one example of a ballpoint pen with a cap, charged with the ink composition of the present invention.

A. The ink composition for the ballpoint pen of the present invention (hereinafter, simply sometimes referred to as an "ink composition") is made by dissolving or dispersing a coloring agent in an aqueous solvent, and it is assumed that the aqueous solvent is substantially composed of water.

Here, being substantially composed of water refers to a case in which no water-soluble organic solvent is contained as described above, or the water-soluble organic solvent is contained in an amount of about 10% or less, preferably about 5% or less and more preferably less than about 1%.

When the water-soluble organic solvent is contained, it is desirable to use those containing the water-soluble organic solvent having SP (solubility parameter) of 8 to 11 in an amount of 80 to 100% in a total amount of the water-soluble organic solvent. The water-soluble organic solvent having SP of 8 to 11 can include butyl alcohol, polyvalent alcohols having 5 or 6 carbon atoms, glycol ethers having 4 to 13 carbon atoms, glycol acetates having 5 to 9 carbon atoms, glycol monoether acetates having 5 to 10 carbon atoms, hydroxycarboxylic acid esters having 5 to 10 carbon atoms and carboxylic acid amide having 4 to 12 carbon atoms. One or two or more are appropriately selected from them and used.

All <dyes> and <pigments> which can be dissolved or dispersed in the aqueous solvent can be used for the coloring agent, and specific examples thereof are exemplified below.

A content (in terms of solid content) of the coloring agent is typically appropriately selected from the range of 1 to 15% in the case of the dye or in the range of 1 to 25% in the case of the pigment as a commonly used amount.

<Dyes>

1) As acid dyes, new coccine (C.I. 16255), tartrazine (C.I. 19140), acid blue black 10B (C.I. 20470), Guinea green (C.I. 42085), brilliant blue FCF (C.I. 42090), acid violet 6BN (C.I. 43525), soluble blue (C.I. 42755), naphthalene green (C.I. 44025), eosin (C.I. 45380), phloxine (C.I. 45410), erythrocin (C.I. 45430), nigrosin (C.I. 50420) and acid flavin (C.I. 56205) and the like are used.

As basic dyes, chrysoidine (C.I. 11270), methyl violet FN(C.I. 42535), crystal violet (C.I. 42555), malachite green (C.I. 42000), Victoria blue FB (C.I. 44045), rhodamine B (C.I. 45170), acridine orange NS (C.I. 46005) and methylene blue B (C.I. 52015) and the like are used.

As direct dyes, congo red (C.I. 22120), direct sky blue 5B (C.I. 24400), violet BB (C.I. 27905), direct deep black EX (C.I. 30235), Kayarus black G conc (C.I. 35225), direct fast black G (C.I. 35255) and phthalocyanine blue (C.I. 74180) and the like are used.

<Pigments>

Inorganic pigments such as carbon black and ultramarine blue and organic pigments such as copper phthalocyanine blue and benzidine yellow, and in addition, water-dispersed pigments already dispersed finely and stably in a water medium using a surfactant and a water-soluble resin, as well as fluorescent pigments and metallic luster pigments can be used.

1) The water-dispersed pigments can include C.I. Pigment Blue 15:3 B (brand name: Sandye Super Blue GLL, pigment content: 22%, supplied by Sanyo Color Works Ltd.), C.I. Pigment Red 146 (brand name Sandye Super Pink FBL, pigment content: 24%, supplied by Sanyo Color Works Ltd.), C.I. Pigment Yellow 81 (brand name: TC Yellow FG, pigment content: approximately 30%, supplied by Dainichiseika Color & Chemicals Mfg. Co., Ltd.) and C.I. Pigment Red 220/166 (brand name: TC Red FG, pigment content: approximately 35%, supplied by Dainichiseika Color & Chemicals Mfg. Co., Ltd.).

The water-dispersed pigments using the water-soluble resin include C.I. Pigment Black 7 (brand name: WA color Black A250, pigment content: 15%, supplied by Dainichiseika Color & Chemicals Mfg. Co., Ltd.), C.I. Pigment Green 7 (brand name: WA-S Color Green, pigment content: 8%, supplied by Dainichiseika Color & Chemicals Mfg. Co., Ltd.), C.I. Pigment Violet 23 (brand name: Micropigmo WMVT-5, pigment content: 20%, supplied by Orient Chemical Industries Co., Ltd.) and C.I. Pigment Yellow 83 (brand name: Emacol NS Yellow 4618, pigment content: 30%, supplied by Sanyo Color Works Ltd.).

2) As fluorescent pigments, synthetic resin fine particulate fluorescent pigments obtained by making a solid solution of a fluorescent dye in a resin matrix can be used.

3) As the metallic luster pigments, it is possible to exemplify metallic luster pigments such as aluminium and brass, metallic luster pigments (pearl pigments) obtained by coating the surface of natural mica, synthetic mica, glass pieces, alumina or transparent film pieces as a core material with a metal oxide such as a titanium oxide, metallic luster pigments in which a metallized film have been provided with a transparent or a colored transparent film and metallic luster pigments which are iridic obtained by finely cutting an iridic film laminating multiple transparent resin layers.

4) In addition, light storing pigments, white pigments such as a titanium dioxide, silica and calcium carbonate, capsule pigments encapsulating a thermal color change composition, and capsule pigments encapsulating a perfume material can be exemplified.

One or two or more of the coloring agents can be appropriately mixed and used, and used in the range of 1 to 25% and preferably 2 to 15% in the ink composition.

When the pigment is used as the coloring agent, a pigment dispersant can be added if necessary. As the pigment dispersant, anionic and nonionic surfactants, anionic polymers such as a polyacrylic acid and a styrene acrylic acid, and nonionic polymers such as a polyvinyl pyrrolidone and a polyvinyl alcohol are used.

In the ink composition using the pigment as the coloring agent, the amount of the solid content is larger than that in the ink composition using the dye as the coloring agent. Thus, when the water in the ink is evaporated, an ink viscosity is increased to easily cause handwriting blur. The ink composition of the present invention can keep the dry up resistance, and hardly causes blur even when the pigment is used, and therefore is excellent in usefulness as the water-based ink composition for pigment-based ballpoint pens.

B. One aspect of the present invention is the ink composition having the above constitution, wherein the dry up resistance is enhanced by adding the particular thickening inhibitor together with the shear thinning viscosity-imparting agent. By combining the shear thinning viscosity-imparting agent with the particular thickening inhibitor, when the water content in the ink is reduced, the shear thinning viscosity-imparting agent becomes a semi-swelled state, resulting in hardly increasing the ink viscosity.

(1) The shear thinning viscosity-imparting agent refers to a chemical which imparts the shear thinning viscosity to the ink composition.

Here, the "shear thinning viscosity" refers to a rheology property which has the nature of a remarkably high viscosity to hardly flow in a static state or when a stress is low and exhibits a good fluidity by reducing the viscosity when the stress is increased. This property is also referred to as pseudo-plasticity.

The ink composition bears the following actions by the imparted shear thinning viscosity (thixotropic property).

Under a high shear stress when writing, a three dimensional structure is temporarily broken down, the viscosity of the ink is reduced, and the ink at the writing edge becomes the ink with low viscosity suitable for writing. That is, the ink has the viscosity suitable for the ink which migrates in spaces between a ball and a ball house by a capillary attraction and is transferred onto a paper surface.

When not writing, the viscosity of the ink is increased, which prevents a leakage of the ink, a separation of the ink and a backflow of the ink.

In the ink composition, the ink viscosity measured by an E type rotary viscometer at 100 rpm is 20 to 200 mPa·s (25° C.), preferably 20 to 100 Pa·s (25° C.) and a shear thinning viscosity index is 0.1 to 0.8, preferably 0.2 to 0.7 in the shear thinning viscosity property.

The shear thinning viscosity index [n] is obtained by applying numerical values in an experimental formula $T=Kj^n$ (T: shear stress, j: shear rate, K: calculated constant).

In order to obtain the above shear thinning viscosity property, the shear thinning viscosity-imparting agent is added in the amount of typically about 0.1 to 20%, preferably 0.1 to 10% and more preferably 0.1 to 5%.

As the shear thinning viscosity-imparting agent, a substance which is soluble or dispersible in water is effective, and one or two or more of the following thickening polysaccharides (thickening stabilizer) and nonionic surfactants (HLB value of 8 to 12) can be selected and used. Among them, xanthan gum, welan gum and succinoglycan are preferable because they are excellent in stability of the ink.

Thickening polysaccharides: xanthan gum, welan gum, succinoglycan (average molecular weight of about 1,000,000 to 8,000,000) which is a heteropolysaccharide modified with an organic acid and whose constitutive monosaccharides are glucose and galactose, gums whose polymer components are composed of glucose, glucuronic acid, fucose and rhamnose, guar gum, locust bean gum and derivatives thereof, hydroxyethylcellulose, alkyl alginate ester, polymers having the molecular weight of 100,000 to 150,000 and composed mainly of alkyl ester of methacrylic acid, and polysaccharides having a gelling ability and extracted from seaweeds such as glucomannan, agar and carrageenin.

Nonionic surfactants (HLB value of 8 to 12): polyglycerin fatty acid ester, polyoxyethylene sorbitan fatty acid ester, polyethylene glycol fatty acid ester, polyoxyethylene alkyl ether/polyoxypropylene alkyl ether, polyoxyethylene alkylphenyl ether and fatty acid amide and the like.

Others: benzylidene sorbitol and benzylidene xylitol or derivatives thereof, crosslinked acrylic acid polymers, salts of dialkyl or dialkenyl sulfosuccinic acids, inorganic fine particles and the like.

(2) The particular thickening inhibitors are one or two or more selected from the group of compounds having the polyoxyethylene (POE) group and/or the polyoxypropylene (POP) group, polyvinyl pyrrolidone, polyvinyl alcohol (PVAL) and cellulose ether (including derivatives thereof).

The amount of the thickening inhibitor to be added is typically about 0.1 to 20%, preferably about 0.1 to 15% and more preferably about 0.5 to 15%. A mixed ratio of the shear thinning viscosity-imparting agent to the thickening inhibitor (former/latter) is typically about 1/0.5 to 1/40, preferably about 1/0.5 to 1/35 and more preferably about 1/1 to 1/30.

(a) As the compounds having the polyoxyethylene group and/or the polyoxypropylene group, it is possible to suitably use polyethylene glycol (PEG), polypropylene glycol (PPG), polyethylene glycol/polypropylene glycol block polymers (PEG/PPG: polyoxyethylene/polyoxypropylene block polymers), PPG ether derivatives, 1,2-ethylene oxide high polymers, surfactants having the POE group and the like.

1) As PEG, specifically, brand names: PEG 200 (average molecular weight: 200), PEG 300 (average molecular weight: 300), PEG 400 (average molecular weight: 400), PEG 600 (average molecular weight: 600), PEG 1000 (average molecular weight: 1000), PEG 1500 (average molecular weight: 1550), PEG 1540 (average molecular weight: 1450), PEG 2000 (average molecular weight: 2000), PEG 4000S (average molecular weight: 3300), PEG 4000N (average molecular weight: 3000), PEG 6000S (average molecular weight: 8300), PEG 6000P (average molecular weight: 8300), PEG 10000 (average molecular weight: 11000), PEG 13000 (average molecular weight: 13000), PEG 20000 (average molecular weight: 20000), and PEG 20000P (average molecular weight: 20000) supplied by Sanyo Chemical Industries, Ltd., can be exemplified. A larger effect as the thickening inhibitor is accomplished by selecting and using those having the molecular weight of 300 or more among them.

2) As PPG, specifically, the brand names: Sannix PP-200 (average molecular weight: 200), PP-400 (average molecular weight: 400), PP-950 (average molecular weight: 950), PP-1000 (average molecular weight: 1000), PP-1200 (average molecular weight: 1150), PP-2000 (average molecular weight: 2000), PP-3000 (average molecular weight: 3000) and PP-4000 (average molecular weight: 4000) supplied by Sanyo Chemical Industries, Ltd., can be exemplified.

3) As the PEG/PPG, specifically, the brand names: Newpol PE-61 (average molecular weight: 1950), PE-62 (average molecular weight: 2200), PE-64 (average molecular weight: 2900), PE-68 (average molecular weight: 8750), PE-71 (average molecular weight: 2300), PE-74 (average molecular weight: 3400), PE-75 (average molecular weight: 4100), PE-78 (average molecular weight: 10250), PE-108 (average molecular weight: 16250) and PE-128 (average molecular weight: 20000) supplied by Sanyo Chemical Industries, Ltd., can be exemplified.

4) The PPG ether derivative includes PPG monoether (polyoxypropylene glycol monoether), polyoxypropylated glycerine (ether of PPG and glycerine) and polyoxypropylated sorbitol (ether of PPG and sorbitol) and the like.

As the PPG monoether, specifically the brand names: Newpol LB-65 (average molecular weight: 340), LB-285 (average molecular weight: 1200), LB-385 (average molecular weight: 1500), LB-625 (average molecular weight: 1870), LB-1145 (average molecular weight: 1980), LB-1715 (average molecular weight: 2400), LB-3000 (average molecular weight: 2800), LB-300X (average molecular weight: 1200), LB-650X (average molecular weight: 1870), LB-1800X (average molecular weight: 2400) and LB-400XY (average molecular weight: 1500) supplied by Sanyo Chemical Industries, Ltd., can be exemplified. Among them, those which are freely compatible with water and have the average molecular weight of 1500 or less are preferable.

As the polyoxypropylated glycerine, specifically the brand names: Sannix GP-250 (average molecular weight: 250), GP-400 (average molecular weight: 400), GP-600 (average molecular weight: 600), GP-1000 (average molecular weight: 1000), GP-3000 (average molecular weight: 3000) and GP-4000 (average molecular weight: 4000) supplied by Sanyo Chemical Industries, Ltd., can be exemplified. Among them, those which are freely compatible with water and have the average molecular weight of 2000 or less are preferable.

As the polyoxypropylated sorbitol, specifically the brand name: Sannix SP-750 (average molecular weight: 700) supplied by Sanyo Chemical Industries, Ltd., can be exemplified.

As the compounds having the POE group and/or the POP group, those having the average molecular weight in the range of 200 or more and 20000 or less are effective. The larger the average molecular weight is, the more a thickening inhibitory effect is increased, but the compatibility with the water is reduced. Thus, the compound is appropriately selected in the range.

The PPG and PPG derivatives having the relatively low average molecular weight are suitably used because when the average molecular weight is increased, the compatibility with water is reduced.

5) As the 1,2-ethylene oxide high polymer, high homopolymers or copolymers of ethylene oxide (EO) or propylene oxide (PO) are available. Typically, those having the average molecular weight in the range of more than 20,000 up to 5,000,000 are used.

As the EO high polymer, specifically the brand names: Alkox R-150 (average molecular weight: 100,000 to 170,000), R-400 (average molecular weight: 180,000 to 250,000), R-1000 (average molecular weight: 250,000 to 300,000), E-30 (average molecular weight: 300,000 to 500,000), E-45 (average molecular weight: 600,000 to 800,000), E-60 (average molecular weight: 1,000,000 to 1,200,000), E-75 (average molecular weight: 2,000,000 to 2,500,000), E-100 (average molecular weight: 2,500,000 to 3,000,000), E-130 (average molecular weight: 3,000,000 to 3,500,000), E-160 (average molecular weight: 3,600,000 to 4,000,000) and E-240 (average molecular weight: 4,000,000 to 5,000,000) supplied by Meisei Chemical Works Ltd., can be exemplified.

As the EO/PO high copolymers, specifically the brand names: Alkox EP-10X (average molecular weight: about 1,000,000) and EP-20X (average molecular weight: about 800,000) supplied by Meisei Chemical Works Ltd., can be exemplified.

When the average molecular weight of the 1,2-EO high polymer is increased, the viscosity thereof itself is increased with the increased viscosity of the ink composition. Thus, its average molecular weight is preferably in the range of more than 20,000 and 3,000,000 or less and more preferably in the range of more than 20,000 and 1,000,000 or less.

6) As the surfactant having the POE group, any of nonionic surfactants, anionic surfactants, cationic surfactants and ampholytic surfactants can be used. The nonionic surfactants and the anionic surfactants are preferable in terms of versatility and obtainability.

As the nonionic surfactants, an ether type, an ether ester type, an ester type and a nitrogen-containing type are available. The ether type includes polyoxyethylene alkyl ether, polyoxyethylene secondary alcohol ether, polyoxyethylene alkylphenyl ether, polyoxyethylene sterol ether, polyoxyethylene hydrogenated sterol ether, polyoxyethylene lanoline derivatives, polyoxyethylene bees wax derivatives, ethylene oxide derivatives of alkylphenol formalin condensate and polyoxyethylene polyoxypropylene alkyl ether. The ether ester type includes polyoxyethylene glycerine fatty acid ester, polyoxyethylene castor oil, polyoxyethylene cured castor oil, polyoxyethylene sorbitan fatty acid ester and polyoxyethylene sorbitol fatty acid ester. The ester type includes polyethylene glycol fatty acid ester, and the nitrogen-containing type includes polyoxyethylene fatty acid amide and polyoxyethylene alkylamine.

As the anionic surfactants, carboxylate salts, sulfonate salts, sulfate ester salts and phosphate ester salts are available. The carboxylate salts include polyoxyethylene alkyl ether carboxylate salts, the sulfonate salts include polyoxyethylene alkyl sulfosuccinate disalts, the sulfate ester salts include polyoxyethylene alkyl ether sulfate salts, secondary higher alcohol ethoxysulfate, polyoxyethylene fatty acid alkanolamide sulfate salts and polyoxyethylene alkylphenyl ether sulfate salts, and the phosphate ester salts include polyoxyethylene alkyl ether phosphate salts and polyoxyethylene alkylphenyl ether phosphate salts.

Further, fluorine-based surfactants and silicone-based surfactants having the polyoxyethylene group in the molecule can be used as the surfactants.

The surfactants having HLB of 5 or more, preferably 8 or more and more preferably 10 or more are suitably used. When HLB is less than 5, the surfactant is difficult to be dissolved or dispersed uniformly in the ink composition, and the desired thickening inhibitory effect is hardly elicited. The greater the content of the polyoxyethylene group is, the larger the thickening inhibitory effect tends to become. Ten or more of the polyoxyethylene groups are preferably contained and 20 or more are more preferably contained.

(b) PVAL may be a completely saponified type or a partially saponified type, and can have a molecular weight from a low molecular weight with a polymerization degree of 1000 or less to a high molecular weight with a polymerization degree of 1500 or more.

As the PVAL, specifically the brand names: Gohsenol KP-06 (saponification degree: 71.0 to 75.0 mol %), and KL-05 (saponification degree: 78.5 to 81.5 mol %) which are K type series (partially saponified type), GL-03 (saponification degree: 86.5 to 89.0 mol %) which is G type series (partially saponified type), C-500 (saponification degree: 95.0 to 97.0 mol %) and A-300 (saponification degree: 97.0 to 98.5 mol %) which are A type series (sub-completely saponified type), and NL-05 (saponification degree: 98.5 mol % or more) which is N type series (completely saponified type) supplied by Nippon Synthetic Chemical Industry Co., Ltd., can be exemplified.

(c) Polyvinyl pyrrolidone having an average molecular weight in the range of about 8,000 to 3,000,000 can be used.

As polyvinyl pyrrolidone, specifically the brand names: Luvitec K17 (K value: 15.0 to 19.0, low molecular weight), K30 (K value: 27.0 to 33.0), K80 (K value: 74.0 to 82.0), K85 (K value: 84.0 to 88.0), K90 (K value: 88.0 to 92.0) and K90HM (K value: 92.0 to 96.0, high molecular weight) supplied by BASF Japan Ltd., can be exemplified. When the average molecular weight is increased, the viscosity thereof itself is increased with the increased viscosity of the ink composition. Thus, they have the K value of preferably 88 or less and more preferably 33 or less.

(d) Cellulose ether (including the derivatives) includes sodium carboxymethylcellulose (CMC), CMC ammonium, hydroxyethylcellulose, hydroxypropylcellulose, hydroxypropylmethylcellulose and methylcellulose.

In the water-based ink composition of the present invention, it is not necessary to actively add the aqueous organic solvent for enhancing the dry up resistance because the particular thickening inhibitor is added.

The water-based ink composition contains no aqueous organic solvent, or even if an aqueous organic solvent is contained, an absolute amount therein is much smaller (preferably less than 1%) than that in the conventional ink compositions. Thus, in the ballpoint pen charged with the ink composition of the present invention, a so-called running phenomenon caused by pooling the ink in the writing edge due to an absorbability of the aqueous organic solvent hardly occurs. Due to the running, the formation of good handwriting is impaired and clothing is accidentally stained in some cases, but these are eliminated.

C. Another aspect of the present invention is an ink composition obtained by further adding one or two or more ionic substances to the ink composition described in the above A.

The ionic substance is ionized in the ink composition to produce a cation and an anion. Bivalent or more cations are easily reacted with other components in the ink composition to form an insoluble salt, thereby producing the blur when writing in some cases. Thus, as the ionic substance, the substance which is ionized to produce a monovalent cation is excellent in the effect to keep the dry up resistance over time as well as keep writing performance, and is used suitably. By adding the ionic substance, the dry up resistance under a high temperature atmosphere (drying facilitating atmosphere) is dramatically enhanced as shown in Examples described later.

The amount of the ionic substance to be added is typically about 1 to 15%, preferably about 2 to 10% and more preferably 3 to 10% in composition.

The amount and the mixed ratio of the shear thinning viscosity-imparting agent and the thickening inhibitor to be added are the same as in the above A.

The mixed ratio of the thickening inhibitor/the ionic substance is 1/0.1 to 1/15, preferably 1/0.13 to 1/13 and more preferably 1/0.2 to 1/10.

When the amount of the ionic substance exceeds 15%, the initial ink viscosity is not sufficient (the high values are not shown). Thus, a dispersion stability of the pigment is impaired, bleeding occurs in handwriting and running easily occurs in a system using the pigment.

The monovalent cation includes alkali metal ions such as a lithium ion, a sodium ion and a potassium ion, fatty acid ammonium ions such as an ammonium ion, monoalkyl ammonium ions, dialkyl ammonium ions, trialkyl ammonium ions and tetraalkyl ammonium ions, and aromatic ammonium ions such as a pyridinium ion and an anilinium ion. The alkali metal ions are preferable.

Sources of the monovalent cation can include the following inorganic salts and organic salts.

1) Inorganic salts: include halides, sulfate salts, nitrate salts, phosphate salts and carbonate salts. Specifically, sodium chloride, sodium bromide, sodium iodide, potassium chloride, potassium bromide, potassium iodide, lithium sulfate, sodium sulfate, ammonium sulfate, sodium nitrate, potassium nitrate, sodium dihydrogen phosphate, disodium hydrogen phosphate, trisodium phosphate, potassium dihydrogen phosphate, dipotassium hydrogen phosphate, tripotassium phosphate, sodium metaphosphate, sodium polyphosphate, potassium polyphosphate, potassium silicate, sodium silicate, sodium carbonate, potassium carbonate and ammonium carbonate are included.

Neutral inorganic salts which give no effect to pH of the ink composition are suitable among these inorganic salts, and halogenated alkali is included.

2) The organic salts include the following (i) salts of low molecular weight organic acids, (ii) ionic surfactants, (iii) ionic water-soluble resins and (iv) water-soluble dyes (most of them have an ionicity).

(i) The low molecular weight organic acids which can form the salts are shown below.

Carboxylic acid: acetic acid, propionic acid, butyric acid, valeric acid, caproic acid, enanthic acid, caprylic acid, pelargonic acid, capric acid, lauric acid, benzoic acid, p-butylbenzoic acid, p-phenylbenzoic acid, a-naphthaleneacetic acid, oxalic acid, succinic acid, butane-1,2,3,4-tetracarboxylic acid, terephthalic acid, naphthalenedicarboxylic acid, trimesic acid, lactic acid, malic acid, glycolic acid, glyceric acid, hydroxybutyric acid, hydroxyisobutyric acid, tartaric acid, mevalonic acid, citric acid, isocitric acid, sorbic acid and the like.

Aliphatic sulfonic acids: pentanesulfonic acid, hexanesulfonic acid, heptanesulfonic acid, octanesulfonic acid, dodecanesulfonic acid, and the like.

Aromatic sulfonic acid: alkylbenzenesulfonic acid such as benzenesulfonic acid, benzenedisulfonic acid and p-toluenesulfonic acid, 1-naphthalenesulfonic acid, 2-naphthalenesulfonic acid, 1,5-naphthalenesulfonic acid disulfonic acid, 1-naphthol-3-sulfonic acid, 1-naphthol-2,5-disulfonic acid, 4-amino-5-hydroxy-2,7-naphthalenesulfonic acid.

Sulfate ester salts: monohexyl sulfate, monooctyl sulfate, monodecyl sulfate, monododecyl sulfate and the like.

Phosphate ester salts: monolauryl phosphate, monostearyl phosphate, monodecyl phosphate, monoisodecyl phosphate and the like.

These salts of the low molecular weight organic acids can be added as the salt in the ink, but alkali hydroxide, aqueous ammonia or amine may be added to the organic acid such as the carboxylic acid, sulfonic acid, sulfate ester or phosphate ester to directly form the salt in the ink when the ink is prepared.

(ii) The ionic surfactants include the following anionic, cationic and ampholytic surfactants. Among them, the anionic and ampholytic surfactants are preferable, and the anionic surfactants are more preferable. Because the ink composition is often adjusted for alkalinity, a wide variety of anionic surfactants are available.

As the anionic surfactants, the following carboxylate salts, sulfonate salts, sulfate ester salts and phosphate ester salts are available.

Carboxylate salts: fatty acid soaps, N-acylamino acid salts, polyoxyethylene alkyl ether carboxylate salts, acylated peptides, polymer polycarboxylate salts and the like.

Sulfonate salts: alkylbenzenesulfonate salts, alkylnaphthalenesulfonate salts, formalin condensates of naphthalenesulfonate salts, formalin condensates of melaminesulfonate salts, dialkylsulfosuccinate ester salts, sulfosuccinate alkyl disalts, polyoxyethylene alkylsulfosuccinate disalts, alkylsulfoacetate salts, α-olefinsulfonate salts, N-acyl-N-methyltaurine salts, sodium dimethyl-5-sulfoisophthalate salts and the like.

Sulfate ester salts: sulfated oils, higher alcohol sulfate ester salts, secondary higher alcohol sulfate ester salts, polyoxyethylene alkyl ether sulfate salts, secondary higher alcohol ethoxysulfate, polyoxyethylene fatty acid alkanolamide sulfate salts, polyoxyethylene alkylphenyl ether sulfate salts, monoglysulfate, sulfate ester salts of fatty acid alkylol amide and the like.

Phosphate ester salts: polyoxyethylene alkyl ether phosphate salts, polyoxyethylene alkylphenyl ether phosphate salts, alkylphosphate salts and the like.

As the cationic surfactants, fatty acid amine salts, fatty acid quaternary ammonium salts, benzalkonium chloride salts, benzethonium chloride, imidazolium salts and the like are available.

As the ampholytic surfactants, carboxybetaine type ampholytic surfactants, aminocarboxylate salts, imidazolium betaine, lecithin, alkylamine oxide and the like are available.

(iii) The ionic water-soluble resin (ionic polymer) includes salts of a cellulose derivative such as carboxymethylcellulose having a carboxyl group, alginate salts, polyacrylate salts, salts of an acrylic acid copolymer resin such as a styrene-acrylic acid copolymer resin and a sulfonic acid-acrylic acid copolymer resin, and salts of a maleic acid copolymer resin such as an ethylene-maleic acid copolymer resin.

(iv) The ionic water-soluble dye includes acidic dyes, direct dyes and basic dyes having ionicity. Among them, the acidic dyes and the direct dyes are preferable. The ink composition is often adjusted for alkalinity and wide varieties of acidic dyes and the direct dyes are available.

As the dye, the above various dyes can be used.

The content of the dye is low in ink composition having a pale color which produces a low concentration of handwriting and the pastel ink composition in combination with the white pigment. Thus, in the system using the dye as the coloring agent, when the sufficient thickening inhibitory effect is not obtained by the water-soluble dye alone, another ionic substance is combined.

D. The following accessory components used for the ballpoint pen water-based ink in addition to the above components can be appropriately added to the ink compositions described in the above A and B.

Inorganic salts: sodium carbonate, sodium phosphate, soda acetate and the like.
pH adjusters: organic basic compounds such as water-soluble amine compounds and the like.
Antirusts: benzotriazole and derivative thereof, tolytriazole, dicyclohexylammonium nightlight, diisopropylammonium nightlight, sodium thiosulfate, saponin and the like.

Preservatives or fungicides: carbolic acid, sodium salts of 1,2-benzothiazoline-3-one, sodium benzoate, sodium dehydroacetate, potassium sorbate, propyl paraoxybenzoate, 2,3,5,6-tetrachloro-4-(methylsulfonyl)pyridine and the like.

Lubricants: metallic soaps, fatty acid ester, ethylene oxide addition type cation activators, phosphoric acid-based activators, thiocarbamate salts, dimethyldithiocarbamate salts and the like.

Antioxidants: ascorbic acid, ascorbic acid derivatives, α-tocopherol, catechin, catechin derivatives, synthetic polyphenol, phosphonate salts, phosphinate salts, sulfite salts, sulfoxylate salts, dithionite salts, thiosulfate salts, thiourea dioxide, formamidinesulfinic acid, glutathione and the like.

Wetting agents: urea, nonionic surfactants, sorbit, mannit, sucrose, glucose, reduced starch hydrolyzed products, sodium pyrophosphate and the like.

Others: fluorine-based surfactants, nonionic, anionic and cationic surfactants, antifoaming agents such as dimethyl polysiloxane, dispersants and the like.

The ionic substance is contained in these compounds. The compound which accomplishes the thickening inhibitory effect by combining the water-soluble organic solvent having the solubility parameter of 8 to 11 can be used by doubling with the ionic substance or used by combining the aforementioned ionic substance.

An evaporation viscosity change rate (x) of 40% water in the ink composition of the present invention is 2 or less, preferably 0.01 to 1.5 and more preferably 0.01 to 1. When these values (x) are 2 or less, the ink compositions are excellent in dry up resistance, and the initial start of writing and writing over time are good, and a stable writing performance can be sustained when the ink compositions are subjected to practical use by charging the ballpoint pen therewith. When these values exceed 2, the change between the viscosity when 40% water in the ink is evaporated and the initial viscosity of the ink is large. Thus, blur and writing malformation occur easily due to the increase in the viscosity. In Examples described later, the evaporation viscosity change rates (x) of 40% water are unexceptionally in the range of 0.01 to 1.

Here, the evaporation viscosity change rates (x) of 40% water means a ratio $(x)=\eta_{40v}/\eta_0$ of the viscosity $(\eta_v)$ when 40% water in the ink based on the total amount of the ink is evaporated to the initial viscosity $(\eta_0)$ of the ink when measured using an EMD type viscometer at 1 min$^{-1}$ (rpm)×20° C.

One or two or more of the water-soluble resins such as acrylic resins, styrene-maleic acid copolymers and dextrin can also be added in a range in which dryness resistance is not prevented.

A sugar mixture containing saccharides of decasaccharide or more in the amount of 40% or more may be contained in the water-based ink composition for the ballpoint pen of the present invention (see Japanese Published Patent Application 2004-26923A). The preventive performance of running of the ink as well as dry up resistance can be satisfied.

Monosaccharide and disaccharide cannot form a dry coating film sufficiently and have high absorbability. Thus, when they are applied to the ballpoint pen, if the writing edge is left to stand facing downward, the running occurs easily. The saccharides of trisaccharide to octasaccharide have lower absorbability than monosaccharide and disaccharide, but do not have sufficient preventive performance of running.

In the above saccharides, a hygroscopic property is decreased as the molecular weight is increased, and the dry coating film is easily formed. Thus, by using the saccharides of the decasaccharide or more, the running of the ink can be prevented as a cap off performance is kept.

As the saccharide of the decasaccharide or more, saccharized starch obtained by enzymatic decomposition of starch or reduced saccharized starch obtained by reducing the terminal group of the saccharized starch can be used.

When the starch is decomposed, saccharides having various degrees of polymerization are generated. It is technically difficult and requires a high cost to completely isolate the saccharides of the decasaccharide or more alone. Thus, by containing the saccharides of the decasaccharide or more in the amount of 40% or more in the sugar mixture in which the saccharides of nonasaccharide or less are present, the above performance can be sufficiently elicited.

The sugar mixture is blended in the amount of 0.5 to 10.0% and preferably 1.0 to 8.0% based on the total amount of ink composition. When the amount is less than 0.5%, the preventive effect on dropping is hardly obtained. When it exceeds 10%, the viscosity of the ink is increased, and ink diffusion and ink blobbing occur and an ink following property when writing is impaired in some cases.

The ink composition is used by being charged in the ballpoint pen in which a ballpoint pen tip is mounted in the writing edge. The ballpoint pen is not limited to the ballpoint pen having the following structure. The ink composition can be obviously applied to various ballpoint pens such as disposable ballpoint pens in which the ink composition for the ballpoint pen is directly charged in a barrel of the ballpoint pen.

A ballpoint pen 10 shown in FIG. 1 has a refill 12 accommodated in a barrel 14 and comprises a cap 16.

The refill 12 has an ink accommodating tube 18 charged with the ink composition C, the ink accommodating tube 18 is communicated with a ballpoint pen tip 22 which supports a ball 20 in a front end, and further an ink backflow prevention member (ink follower) 24 is mounted on an end side of the ink composition C.

Figure 2:
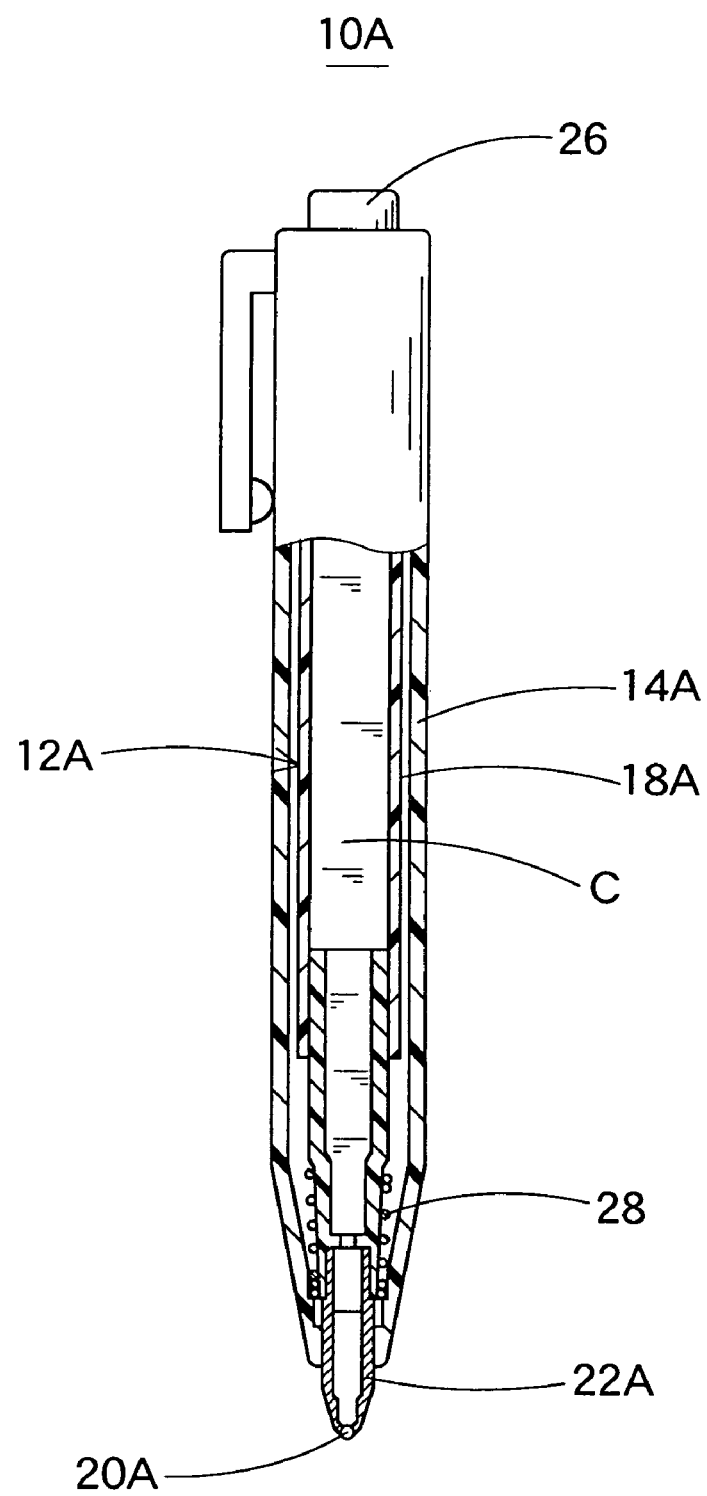
FIG. 2 is a vertical cross sectional view showing in turn one example of a retractable ballpoint pen.

A ballpoint pen 10A shown in FIG. 2 is a knock type in which a refill 12A is housed in a barrel 14A and a ballpoint pen tip 22 in the front end is housed retractably.

In the knock type shown in the figure, a back end of the barrel is provided with a knocking member 26, and the writing edge (ballpoint pen tip 22A) of the refill 12A is retracted and extruded from a front opening of the barrel 14A by pressing the knocking member 26. Retraction and extrusion are performed by compression and release of the compression of a coil spring 28 supported in the front end of the barrel 14A.

The structure and the shape of the retractable ballpoint pen are not particularly limited as long as the writing edge provided in the refill for the ballpoint pen is exposed to ambient air and housed in the barrel and the writing edge is extruded from the opening of the barrel by a retractable mechanism.

An operation method of the retractable mechanism is not limited to the knock type, and includes a rotary type and a slide type.

As the rotary type, the constitution in which a back end of the barrel is provided with a rotary member and the writing edge of the refill for the ballpoint pen is retracted and extruded from the front opening of the barrel by rotating the rotary member can be exemplified.

As the slide type, the constitution in which a side face of the barrel is provided with a slide member and the writing edge of the refill for the ballpoint pen is retracted and extruded from the front opening of the barrel by operating the slide member, or the constitution in which the writing edge of the refill for the ballpoint pen is retracted and extruded from the front opening of the barrel by sliding a clip member provided in the barrel can be exemplified.

The retractable ballpoint pen may be a composite type ballpoint pen accommodating multiple refills in the barrel.

As the structure of the ballpoint pen tip, the structures used conventionally and commonly are effective. The structure in which the ball is supported in a ball supporting member formed by pressing and deforming a metal pipe near the front end from an outer face to an inner face, the structure in which the ball is supported in the ball supporting member by forming a tip member by cutting and processing a metal material using a drill, the structure in which the ball is biased by a spring member, or the structure in which a ball receiving seat made from a resin is provided inside the tip made from the metal or a plastic can be exemplified.

As the ball, a super hard alloy, stainless steel, ruby, ceramic, resin or rubber ball having a diameter of about 0.1 to 3.0 mm, preferably 0.15 to 1.5 mm and more preferably 0.3 to 1.0 mm can be used.

The ink accommodating tube (including the refill) accommodating the ink composition and the barrel are made from thermoplastic resins such as polyethylene, polypropylene, polyethylene terephthalate and nylon, but may be made from metal.

Further, by using a transparent, colored transparent or translucent molded body as the ink accommodating tube or the barrel, a color and a remaining amount of the ink can be confirmed.

The ink backflow prevention member (ink follower) is formed from a composition composed mainly of a nonvolatile liquid or a hardly volatile liquid.

Specifically, petrolatum, spindle oil, castor oil, olive oil, purified mineral oil, liquid paraffin, polybutene, $\alpha$-olefin, an oligomer or a co-oligomer of $\alpha$-olefin, dimethyl silicone oil, methylphenyl silicone oil, amino-modified silicone oil, polyether-modified silicone oil and fatty acid-modified silicone oil are included, and one or two or more thereof can be combined.

It is preferable that the nonvolatile liquid and/or the hardly volatile liquid is thickened to the suitable viscosity by adding the gelling agent. As the gelling agent, silica whose surface has been given a hydrophobic treatment, fine particle silica whose surface has been given a methylation treatment, aluminium silicate, swelling mica, clay-based thickeners such as bentonite and montmorillonite given the hydrophobic treatment, fatty acid metal soaps such as magnesium stearate, calcium stearate, aluminium stearate and zinc stearate, tribenzylidene sorbitol, fatty acid amide, amide-modified polyethylene wax, hydrogenated castor oil, dextrin-based compounds such as fatty acid dextrin, and cellulose-based compounds can be exemplified.

Further, as the ink backflow prevention member (ink follower), the above ink backflow prevention member (ink follower) made from the compositions may be combined with a solid ink backflow prevention member (ink follower) such as a plastic molded body.

EXAMPLES

Combinations of the water-based ink compositions for the ballpoint pen are shown in the following tables.

TABLE 1

| | Raw material | Note | Example 1 | 2 | 3 | 4 | 5 | 6 |
|---|---|---|---|---|---|---|---|---|
| Coloring agent | Black dye aqueous solution | (1) | | 30.0 | 30.0 | | | |
| | Red dye | (2) | | | | 3.0 | 3.0 | 3.0 |
| | Blue pigment dispersion | (3) | 20.0 | | | | | |
| Shear thinning viscosity-imparting agent | Xanthan gum | (9) | 0.5 | 0.5 | 0.5 | 0.5 | 0.5 | 0.5 |
| Thickening inhibitor | Polyethylene glycol (average molecular weight 400) | (11) | 10.0 | | | | | |
| | Polyethylene glycol (average molecular weight 20000) | (12) | | 1.0 | | | | |
| | Polyethylene glycol/Polypropylene glycol block polymer (average molecular weight 8750) | (13) | | | 2.0 | | | |
| | Polypropylene glycol (average molecular weight 200) | (14) | | | | 10.0 | | |
| | Polypropylene glycol monoether (average molecular weight 340) | (15) | | | | | 10.0 | |
| | Polyoxypropylated glycerine (average molecular weight 250) | (16) | | | | | | 15.0 |
| Lubricant | Phosphate ester-based surfactant | (10) | 0.2 | 0.2 | 0.2 | 0.2 | 0.2 | 0.2 |
| Preservative | Carbolic acid | | 0.3 | 0.3 | 0.3 | 0.3 | 0.3 | 0.3 |
| | Water | | 69.0 | 68.0 | 67.0 | 86.0 | 86.0 | 81.0 |

TABLE 2

|  | Raw material | Note | Example 7 | 8 | 9 | 10 | 11 | 12 | 13 |
|---|---|---|---|---|---|---|---|---|---|
| Coloring agent | Black dye aqueous solution | (1) |  | 30.0 | 30.0 |  |  |  | 30.0 |
|  | Red dye | (2) |  |  |  | 3.0 | 3.0 | 3.0 |  |
|  | Blue pigment dispersion | (3) | 20.0 |  |  |  |  |  |  |
| Shear thinning viscosity-imparting agent | Xanthan gum | (9) | 0.5 | 0.5 | 0.5 | 0.5 | 0.5 | 0.5 | 0.5 |
| Thickening inhibitor | Polyvinyl pyrrolidone | (17) | 5.0 |  |  |  |  | 5.0 |  |
|  | Polyvinyl alcohol | (18) |  | 1.0 |  |  |  |  |  |
|  | Hydroxypropylcellulose | (19) |  |  | 1.0 |  |  |  |  |
|  | Carboxymethylcellulose | (20) |  |  |  | 2.0 |  |  |  |
|  | Methylcellulose | (21) |  |  |  |  | 0.5 |  |  |
|  | Polyethylene oxide | (22) |  |  |  |  |  |  | 0.5 |
| Lubricant | Phosphate ester-based surfactant | (10) | 0.2 | 0.2 | 0.2 | 0.2 | 0.2 | 0.2 | 0.2 |
|  | Carbolic acid |  | 0.3 | 0.3 | 0.3 | 0.3 | 0.3 | 0.3 | 0.3 |
|  | Water |  | 74.0 | 68.0 | 68.0 | 94.0 | 95.5 | 91.0 | 68.5 |

TABLE 3

|  | Raw material | Note | Example 14 | 15 | 16 | 17 | 18 | 19 | 20 |
|---|---|---|---|---|---|---|---|---|---|
| Coloring agent | Black dye aqueous solution | (1) |  | 30.0 | 30.0 |  |  |  |  |
|  | Red dye | (2) |  |  |  | 3.0 | 3.0 | 3.0 | 3.0 |
|  | Blue pigment dispersion | (3) | 20.0 |  |  |  |  |  |  |
| Shear thinning viscosity-imparting agent | Xanthan gum | (9) | 0.5 | 0.5 | 0.5 | 0.5 | 0.5 | 0.5 | 0.5 |
| Thickening inhibitor | POE (20)POP(6) Tetradecyl ether | (23) | 3.0 |  |  |  |  |  |  |
|  | Monopalmitic acid POE(20)sorbitan | (24) |  |  |  |  |  | 5.0 |  |
|  | Tetraoleic acid POE(60)sorbit | (25) |  |  |  |  |  |  | 5.0 |
|  | POE(20)Phytosterol | (26) |  |  |  | 5.0 |  |  |  |
|  | Monostearic acid polyethylene glycol(25EO) | (27) |  |  |  |  | 5.0 |  |  |
|  | POE(40)Cetyl ether | (28) |  | 2.0 |  |  |  |  |  |
|  | POE Nonylphenyl ether ammonium sulfate | (29) |  |  | 5.0 |  |  |  |  |
| Lubricant | Phosphate ester-based surfactant | (10) | 0.2 | 0.2 | 0.2 | 0.2 | 0.2 | 0.2 | 0.2 |
|  | Carbolic acid |  | 0.3 | 0.3 | 0.3 | 0.3 | 0.3 | 0.3 | 0.3 |
|  | Water |  | 76.0 | 67.0 | 64.0 | 91.0 | 91.0 | 91.0 | 91.0 |

TABLE 4

|  | Raw material | Note | Example 21 | 22 | 23 | 24 | 25 |
|---|---|---|---|---|---|---|---|
| Coloring agent | Carbon black | (4) | 2.0 |  |  | 2.0 |  |
|  | Red pigment | (5) |  | 2.0 |  |  |  |
|  | Blue pigment | (6) |  |  | 2.0 |  |  |
|  | Pink resin particle | (7) |  |  |  |  | 6.0 |
| Pigment dispersant | Polyvinyl pyrrolidone | (8) | 2.0 | 2.0 | 2.0 | 2.0 |  |
| Shear thinning viscosity-imparting agent | Xanthan gum | (9) | 0.5 | 0.5 | 0.5 | 0.5 | 0.5 |

TABLE 4-continued

|  | Raw material | Note | Example 21 | 22 | 23 | 24 | 25 |
|---|---|---|---|---|---|---|---|
| Thickening inhibitor | Polyethylene glycol (average molecular weight 400) | (11) | 10.0 | | | | |
|  | Polyethylene glycol (average molecular weight 20000) | (12) | | 1.0 | | | |
|  | Polyethylene glycol/Polypropylene glycol block polymer (average molecular weight 8750) | (13) | | | 2.0 | | |
|  | Polypropylene glycol (average molecular weight 200) | (14) | | | | 10.0 | 10.0 |
| Ionic substance | Sodium salt of naphthalenesulfonic acid formalin condensate | (31) | | 2.0 | 4.0 | | |
|  | Potassium chloride | | | 5.0 | | | |
|  | Ammonium salt aqueous solution of styrene-acrylic acid copolymer | (32) | | | | 20.0 | 20.0 |
| Lubricant | Phosphate ester-based surfactant | (10) | 0.2 | 0.2 | 0.2 | 0.2 | 0.2 |
| Preservative | Carbolic acid | | 0.3 | 0.3 | 0.3 | 0.3 | 0.3 |
|  | Water | | 80.0 | 92.0 | 89.0 | 65.0 | 63.0 |

TABLE 5

|  | Raw material | Note | Example 26 | 27 | 28 | 29 | 30 |
|---|---|---|---|---|---|---|---|
| Coloring agent | Reversible thermally color-changeable pigment A | | 10.0 | 10.0 | 10.0 | | |
|  | Reversible thermally color-changeable pigment B | | | | | 10.0 | 10.0 |
| Shear thinning viscosity-imparting agent | Xanthan gum | (9) | 0.5 | 0.5 | 0.5 | 0.5 | 0.5 |
| Thickening inhibitor | Polyethylene glycol (average molecular weight 20000) | (12) | 1.0 | 1.0 | | | |
|  | Polyethylene glycol/Polypropylene glycol block polymer (average molecular weight 8750) | (13) | | | 2.0 | | |
|  | Polypropylene glycol (average molecular weight 200) | (14) | | | | 10.0 | |
|  | Polyoxypropylated glycerine (average molecular weight 250) | (16) | | | | | 15.0 |
| Ionic substance | Sodium salt of naphthalenesulfonic acid formalin condensate | (31) | 3.0 | | | | 3.0 |
|  | Ammonium salt aqueous solution of styrene-acrylic acid copolymer | (32) | | 16.1 | | | |
|  | Aqueous solution of disodium dodecyldiphenyl ether disulfonate | (33) | | | 6.4 | | |
|  | Aqueous solution of sodium dioctylsulfosuccinate | (34) | | | | 7.1 | |
| Lubricant | Phosphate ester-based surfactant | (10) | 0.2 | 0.2 | 0.2 | 0.2 | 0.2 |
| Preservative | Carbolic acid | | 0.3 | 0.3 | 0.3 | 0.3 | 0.3 |
|  | Water | | 85.0 | 71.9 | 80.6 | 71.9 | 71.0 |

TABLE 6

|  | Raw material | Note | Example 31 | 32 | 33 | 34 | 35 |
|---|---|---|---|---|---|---|---|
| Coloring agent | Carbon black | (4) | 2.0 |  |  | 2.0 |  |
|  | Red pigment | (5) |  | 2.0 |  |  |  |
|  | Blue pigment | (6) |  |  | 2.0 |  |  |
|  | Pink resin particle | (7) |  |  |  |  | 6.0 |
| Pigment dispersant | Polyvinyl pyrrolidone | (8) | 2.0 | 2.0 | 2.0 | 2.0 |  |
| Shear thinning viscosity-imparting agent | Xanthan gum | (9) | 0.5 | 0.5 | 0.5 | 0.5 | 0.5 |
| Thickening inhibitor | Polyvinyl pyrrolidone | (17) | 5.0 |  |  | 5.0 |  |
|  | Polyvinyl alcohol | (18) |  | 0.5 |  |  | 0.7 |
|  | Carboxymethylcellulose | (20) |  |  | 1.0 |  |  |
| Ionic substance | Sodium salt of naphthalenesulfonic acid formalin condensate | (31) | 3.0 | 3.0 | 7.0 |  | 7.0 |
|  | Ammonium salt aqueous solution of styrene-acrylic acid copolymer | (32) |  |  |  | 10.0 |  |
| Lubricant | Phosphate ester-based surfactant | (10) | 0.2 | 0.2 | 0.2 | 0.2 | 0.2 |
| Preservative | Carbolic acid |  | 0.3 | 0.3 | 0.3 | 0.3 | 0.3 |
|  | Water |  | 87.0 | 91.5 | 87.0 | 80.0 | 85.3 |

TABLE 7

|  | Raw material | Note | Example 36 | 37 | 38 | 39 | 40 |
|---|---|---|---|---|---|---|---|
| Coloring agent | Reversible thermally color-changeable pigment A |  | 10.0 | 10.0 |  |  |  |
|  | Reversible thermally color-changeable pigment B |  |  |  | 10.0 | 10.0 | 10.0 |
| Shear thinning viscosity-imparting agent | Xanthan gum | (9) | 0.5 | 0.5 | 0.5 | 0.5 | 0.5 |
| Thickening inhibitor | Polyvinyl pyrrolidone | (17) | 5.0 | 5.0 |  |  |  |
|  | Polyvinyl alcohol | (18) |  |  | 0.7 | 0.7 |  |
|  | Carboxymethylcellulose | (20) |  |  |  |  | 1.0 |
| Ionic substance | Potassium chloride |  | 1.0 |  |  |  |  |
|  | Potassium sorbate |  |  | 2.0 |  |  |  |
|  | Sodium salt of naphthalenesulfonic acid formalin condensate | (31) |  |  | 7.0 |  |  |
|  | Aqueous solution of disodium dodecyldiphenyl ether disulfonate | (33) |  |  |  | 10.6 | 12.8 |
| Lubricant | Phosphate ester-based surfactant | (10) | 0.2 | 0.2 | 0.2 | 0.2 | 0.2 |
| Preservative | Carbolic acid |  | 0.3 | 0.3 | 0.3 | 0.3 | 0.3 |
|  | Water |  | 83.0 | 82.0 | 81.3 | 77.7 | 75.2 |

TABLE 8

|  | Raw material | Note | Example 41 | 42 | 43 | 44 | 45 |
|---|---|---|---|---|---|---|---|
| Coloring agent | Carbon black | (4) | 2.0 |  |  | 2.0 |  |
|  | Red pigment | (5) |  | 2.0 |  |  |  |
|  | Blue pigment | (6) |  |  | 2.0 |  |  |
|  | Pink resin particle | (7) |  |  |  |  | 6.0 |
| Pigment dispersant | Polyvinyl pyrrolidone | (8) | 2.0 | 2.0 | 2.0 | 2.0 |  |
| Shear thinning viscosity-imparting agent | Xanthan gum | (9) | 0.5 | 0.5 | 0.5 | 0.5 | 0.5 |
| Thickening inhibitor | POE(20)POP(6)Tetradecyl ether | (23) | 3.0 |  |  |  |  |
|  | Monopalmitic acid POE(20)sorbitan | (24) |  | 5.0 |  |  |  |

TABLE 8-continued

|  | Raw material | Note | Example 41 | 42 | 43 | 44 | 45 |
|---|---|---|---|---|---|---|---|
| Ionic substance | Tetraoleic acid POE(60)sorbit | (25) |  |  | 5.0 |  |  |
|  | POE(40)Cetyl ether | (28) |  |  |  | 2.0 | 2.0 |
|  | Sodium salt of naphthalenesulfonic acid formalin condensate | (31) | 3.0 |  | 3.0 |  |  |
|  | Potassium chloride |  |  | 3.0 |  |  |  |
|  | Ammonium salt aqueous solution of styrene-acrylic acid copolymer | (32) |  |  |  | 13.0 |  |
|  | Polycarboxylic acid type sodium aqueous solution | (35) |  |  |  |  | 12.0 |
| Lubricant | Phosphate ester-based surfactant | (10) | 0.2 | 0.2 | 0.2 | 0.2 | 0.2 |
| Preservative | Carbolic acid |  | 0.3 | 0.3 | 0.3 | 0.3 | 0.3 |
|  | Water |  | 89.0 | 87.0 | 87.0 | 80.0 | 79.0 |

TABLE 9

|  | Raw material | Note | Example 46 | 47 | 48 | 49 | 50 |
|---|---|---|---|---|---|---|---|
| Coloring agent | Reversible thermally color-changeable pigment A |  | 10.0 | 10.0 |  |  |  |
|  | Reversible thermally color-changeable pigment B |  |  |  | 10.0 | 10.0 | 10.0 |
| Shear thinning viscosity-imparting agent | Xanthan gum | (9) | 0.5 | 0.5 | 0.5 | 0.5 | 0.5 |
| Thickening inhibitor | POE(20)POP(6)Tetradecyl ether | (23) | 3.0 |  |  |  |  |
|  | Tetraoleic acid POE(60)sorbit | (25) |  | 5.0 |  |  |  |
|  | POE(40)Cetyl ether | (28) |  |  |  |  | 2.0 |
|  | POE(20)Phytosterol | (26) |  |  | 5.0 | 5.0 |  |
| Ionic substance | Potassium iodide |  | 7.0 |  |  |  |  |
|  | Sodium salt of naphthalenesulfonic acid formalin condensate | (31) |  | 5.0 | 5.0 |  |  |
|  | Potassium sorbate |  |  |  |  | 5.0 | 7.0 |
| Lubricant | Phosphate ester-based surfactant | (10) | 0.2 | 0.2 | 0.2 | 0.2 | 0.2 |
| Preservative | Carbolic acid |  | 0.3 | 0.3 | 0.3 | 0.3 | 0.3 |
|  | Water |  | 79.0 | 79.0 | 79.0 | 79.0 | 80.0 |

TABLE 10

|  | Raw material | Note | Comparative Example 1 | 2 | 3 | 4 | 5 | 6 | 7 |
|---|---|---|---|---|---|---|---|---|---|
| Coloring agent | Black dye aqueous solution | (1) |  | 30.0 | 30.0 |  |  |  |  |
|  | Red dye | (2) |  |  |  | 3.0 | 3.0 | 3.0 | 3.0 |
|  | Blue pigment dispersion | (3) | 20.0 |  |  |  |  |  |  |
| Shear thinning viscosity-imparting agent | Xanthan gum | (9) | 0.5 | 0.5 | 0.5 | 0.5 | 0.5 | 0.5 | 0.5 |
|  | Glycerine |  | 10.0 |  |  |  |  |  |  |
|  | Ethylene glycol |  |  | 10.0 |  |  |  |  |  |
|  | Diethylene glycol |  |  |  | 10.0 |  |  |  |  |
|  | Propylene glycol |  |  |  |  | 10.0 |  |  |  |
|  | 2-Pyrrolidone |  |  |  |  |  | 10.0 |  |  |
|  | N-Methyl-2-pyrrolidone |  |  |  |  |  |  | 10.0 |  |

TABLE 10-continued

|  | Raw material | Note | Comparative Example | | | | | | |
|---|---|---|---|---|---|---|---|---|---|
|  |  |  | 1 | 2 | 3 | 4 | 5 | 6 | 7 |
|  | Decaglyceryl monolaurate | (30) |  |  |  |  |  |  | 2.0 |
| Lubricant | Phosphate ester-based surfactant | (10) | 0.2 | 0.2 | 0.2 | 0.2 | 0.2 | 0.2 | 0.2 |
| Preservative | Carbolic acid |  | 0.3 | 0.3 | 0.3 | 0.3 | 0.3 | 0.3 | 0.3 |
|  | Water |  | 69.0 | 59.0 | 59.0 | 86.0 | 86.0 | 86.0 | 94.0 |

TABLE 11

|  | Raw material | Note | Comparative Example | | | | | | | | |
|---|---|---|---|---|---|---|---|---|---|---|---|
|  |  |  | 8 | 9 | 10 | 11 | 12 | 13 | 14 | 15 | 16 |
| Coloring agent | Carbon black | (4) | 2.0 |  |  | 2.0 |  |  |  |  |  |
|  | Red pigment | (5) |  | 2.0 |  |  |  |  |  |  |  |
|  | Blue pigment | (6) |  |  | 2.0 |  |  |  |  |  |  |
|  | Pink resin particle | (7) |  |  |  |  | 6.0 |  |  |  |  |
|  | Reversible thermally color-changeable pigment A |  |  |  |  |  |  | 10.0 | 10.0 |  |  |
|  | Reversible thermally color-changeable pigment B |  |  |  |  |  |  |  |  | 10.0 | 10.0 |
| Pigment dispersant | Polyvinyl pyrrolidone | (8) | 2.0 | 2.0 | 2.0 | 2.0 |  |  |  |  |  |
| Shear thinning viscosity-imparting agent | Xanthan gum | (9) | 0.5 | 0.5 | 0.5 | 0.5 | 0.5 | 0.5 | 0.5 | 0.5 | 0.5 |
| Thickening inhibitor | Polyethylene glycol (average molecular weight 400) | (11) | 10.0 |  |  |  |  |  |  |  |  |
|  | Polyethylene glycol (average molecular weight 20000) | (12) |  | 1.0 |  |  |  |  | 1.0 |  |  |
|  | Polyethylene glycol/polypropylene glycol block polymer (average molecular weight 8750) | (13) |  |  | 2.0 |  |  |  | 2.0 |  |  |
|  | Polypropylene glycol (average molecular weight 200) | (14) |  |  |  | 10.0 | 10.0 |  |  | 10.0 |  |
|  | Polyoxypropylated glycerine (average molecular weight 250) | (16) |  |  |  |  |  |  |  |  | 15.0 |
| Lubricant | Phosphate ester-based surfactant | (10) | 0.2 | 0.2 | 0.2 | 0.2 | 0.2 | 0.2 | 0.2 | 0.2 | 0.2 |
| Preservative | Carbolic acid |  | 0.2 | 0.3 | 0.3 | 0.3 | 0.3 | 0.3 | 0.3 | 0.3 | 0.3 |
|  | Water |  | 85.1 | 94.0 | 93.0 | 85.0 | 83.0 | 88.0 | 87.0 | 79.0 | 74.0 |

TABLE 12

| | Raw material | Note | Comparative Example | | | | | | |
|---|---|---|---|---|---|---|---|---|---|
| | | | 17 | 18 | 19 | 20 | 21 | 22 | 23 |
| Coloring agent | Carbon black | (4) | 2.0 | | | | | | |
| | Red pigment | (5) | | 2.0 | | | | | |
| | Blue pigment | (6) | | | 2.0 | | | | |
| | Pink resin particle | (7) | | | | 6.0 | | | |
| | Reversible thermally color-changeable pigment A | | | | | | 10.0 | | |
| | Reversible thermally color-changeable pigment B | | | | | | | 10.0 | 10.0 |
| Pigment dispersant | Polyvinyl pyrrolidone | (8) | 2.0 | 2.0 | 2.0 | | | | |
| Shear thinning viscosity-imparting agent | Xanthan gum | (9) | 0.5 | 0.5 | 0.5 | 0.5 | 0.5 | 0.5 | 0.5 |
| Thickening inhibitor | Polyvinyl pyrrolidone | (17) | 5.0 | | | | 5.0 | | |
| | Polyvinyl alcohol | (18) | | 0.5 | | 0.7 | | 0.7 | |
| | Carboxymethylcellulose | (20) | | | 1.0 | | | | 1.0 |
| Lubricant | Phosphate ester-based surfactant | (10) | 0.2 | 0.2 | 0.2 | 0.2 | 0.2 | 0.2 | 0.2 |
| Preservative | Carbolic acid | | 0.3 | 0.3 | 0.3 | 0.3 | 0.3 | 0.3 | 0.3 |
| | Water | | 90.0 | 94.5 | 94.0 | 92.3 | 84.0 | 88.3 | 88.0 |

TABLE 13

| | Raw material | Note | Comparative Example | | | | | | | | |
|---|---|---|---|---|---|---|---|---|---|---|---|
| | | | 24 | 25 | 26 | 27 | 28 | 29 | 30 | 31 | 32 |
| Coloring agent | Carbon black | (4) | 2.0 | | | 2.0 | | | | | |
| | Red pigment | (5) | | 2.0 | | | | | | | |
| | Blue pigment | (6) | | | 2.0 | | | | | | |
| | Pink resin particle | (7) | | | | | 6.0 | | | | |
| | Reversible thermally color-changeable pigment A | | | | | | | 10.0 | 10.0 | | |
| | Reversible thermally color-changeable pigment B | | | | | | | | | 10.0 | 10.0 |
| Pigment dispersant | Polyvinyl pyrrolidone | (8) | 2.0 | 2.0 | 2.0 | 2.0 | | | | | |
| Shear thinning viscosity-imparting agent | Xanthan gum | (9) | 0.5 | 0.5 | 0.5 | 0.5 | 0.5 | 0.5 | 0.5 | 0.5 | 0.5 |
| Thickening inhibitor | POE(20)POP(6) Tetradecyl ether | (23) | 3.0 | | | | | 3.0 | | | |
| | Monopalmitic acid POE(20)sorbitan | (24) | | 5.0 | | | | | | | |
| | Tetraoleic acid POE(60)sorbit | (25) | | | 5.0 | | | | 5.0 | | |
| | POE(40)Cetyl ether | (28) | | | | 2.0 | 2.0 | | | | 2.0 |
| | POE(20) Phytosterol | (26) | | | | | | | | 5.0 | |
| Lubricant | Phosphate ester-based surfactant | (10) | 0.2 | 0.2 | 0.2 | 0.2 | 0.2 | 0.2 | 0.2 | 0.2 | 0.2 |
| Preservative | Carbolic acid | | 0.3 | 0.3 | 0.3 | 0.3 | 0.3 | 0.3 | 0.3 | 0.3 | 0.3 |
| | Water | | 92.0 | 90.0 | 90.0 | 93.0 | 91.0 | 86.0 | 84.0 | 84.0 | 87.0 |

Contents of materials in the tables are described in conjunction with noted numbers.

(1) Brand name: Water Black 100-L, dye content 20% supplied by Orient Chemical Industries Co., Ltd.,
(2) Brand name: Phloxine supplied by Aizen Co., Ltd.,
(3) Brand name: Sandye Super Blue GLL, pigment content: 22%, supplied by Sanyo Color Works Ltd.)
(4) C.I. pigment black 7
(5) C.I. pigment red 254
(6) C.I. pigment blue 15:3
(7) Brand name: Epocolor FP-10 supplied by Nippon Shokubai Co., Ltd.,
(8) Brand name: Luvitec K-30 supplied by BASF
(9) Brand name: Kelzan supplied by Sansho Co., Ltd.,
(10) Brand name: Prisurf M208B, ethanolamine salt of polyoxyethylene octyl ether phosphate ester, supplied by Daiichi Kogyo Seiyaku Co., Ltd.,

(11) Brand name: PEG400 supplied by Sanyo Chemical Industries, Ltd.,

(12) Brand name: PEG20000 supplied by Sanyo Chemical Industries, Ltd.,

(13) Brand name: Newpol PE-68 supplied by Sanyo Chemical Industries, Ltd.,

(14) Brand name: Sannix PP-20 supplied by Sanyo Chemical Industries, Ltd.,

(15) Brand name: Newpol LB-65 supplied by Sanyo Chemical Industries, Ltd.,

(16) Brand name: Sannix GP-250 supplied by Sanyo Chemical Industries, Ltd.,

(17) Brand name: Luvitec K-17 supplied by BASF Japan Ltd.,

(18) Brand name: Gohsenol KP-06 supplied by Nippon Synthetic Chemical Industry Co., Ltd.,

(19) Brand name: HPC-SL supplied by Nippon Soda Co., Ltd.,

(20) Brand name: Cellogen 5A supplied by Daiichi Kogyo Seiyaku Co., Ltd.,

(21) Brand name: Metrose SM-15 supplied by Shin-Etsu Chemical Co., Ltd.,

(22) Brand name: Alkox R-400 supplied by Meisei Chemical Works Ltd.,

(23) Brand name: PEN-4620 supplied by Nikko Chemicals Co., Ltd.,

(24) Brand name: TP-10 supplied by Nikko Chemicals Co., Ltd.,

(25) Brand name: GO-460 supplied by Nikko Chemicals Co., Ltd.,

(26) Brand name: BPS-20 supplied by Nikko Chemicals Co., Ltd.,

(27) Brand name: MYS-25 supplied by Nikko Chemicals Co., Ltd.,

(28) Brand name: BC-40TX supplied by Nikko Chemicals Co., Ltd.,

(29) Brand name: Hitenol N-08 supplied by Daiichi Kogyo Seiyaku Co., Ltd.,

(30) Brand name: Decaglyn 1-L supplied by Nikko Chemicals Co., Ltd.,

(31) Brand name: Demol N supplied by Kao Corporation,

(32) Brand name: Joncryl 61J (active ingredient 30.5%) supplied by BASF,

(33) Brand name: Dowfax 2A1 (active ingredient 47%) supplied by the Dow Chemical Company,

(34) Brand name: Pelex OT-P (active ingredient 70%) supplied by Kao Corporation,

(35) Brand name: Demol EP (active ingredient 25%) supplied by Kao Corporation.

A. Preparation of Ink Composition

The ink compositions in Examples and Comparative Examples were prepared by 1) stirring respective ingredients in the formulation displayed in tables in a mixer for one hour while heating at 60° C. followed by cooling and filtrating the mixture when the dye was used as the coloring agent or 2) mixing the respective ingredients in the formulation and stirring the mixture for one hour when the pigment was used as the coloring agent.

The reversible thermally color-changeable pigments in the tables were prepared by the following method.

<Preparation of Reversible Thermally Color-Changeable Pigment A>

A reversible thermally color-changeable composition composed of (a) 2.0 parts of 3-(4-diethylamino-2-hexyloxyphenyl)-3-(1-ethyl-2-methylindole-3-yl)-4-azaphthalide as an electron-donating color-developing organic compound, (b) 8.0 parts of 1,1-bis(4-hydroxyphenyl)n-decane as an electron accepting compound and (c) 50.0 parts of lauric acid-4-benzyloxyphenylethyl as a reaction medium which controlled a color developing reaction of (a) and (b) was dissolved uniformly while heating, the resulting solution in which 30.0 parts of aromatic isocyanate prepolymer and 40 parts of ethyl acetate as wall film materials had been mixed was emulsified and dispersed in an aqueous solution of 8% polyvinyl alcohol to make fine droplets, which were then stirred at 70° C. for about one hour, subsequently 2.5 parts of water-soluble aliphatic modified amine were gradually added thereto while stirring, and the resulting dispersion was kept at a liquid temperature of 90° C. and continuously stirred for about 6 hours to obtain a suspension of a reversible thermally color-changeable pigment A.

The reversible thermally color-changeable pigment was isolated from the suspension by centrifugation to obtain the reversible thermally color-changeable pigment A whose color was changed from a blue color to colorless (solid content: 60%, average particle diameter: 3 µm).

The reversible thermally color-changeable pigment A exhibited a color change behavior which began to develop a blue color from 6° C. when cooled from a colorless state, exhibited a blue color completely at −2° C., and began to lose color from at 56° C. when heated from this state and completely lost color to become colorless at 70° C. This color change behavior could be reproduced repeatedly.

The reversible thermally color-changeable pigment A was cooled to −2° C. or below in advance to completely develop color, and used as the coloring agent.

<Preparation of Reversible Thermally Color-Changeable Pigment B>

A reversible thermally color-changeable pigment B (solid content: 60%, average particle diameter: 2 µm) whose color was changed from a black color to colorless was obtained in the same way as in the reversible thermally color-changeable pigment A, except that the ingredient (a) was changed to 5.0 parts of 2-(2-chloroanilino)-6-di-n-butylaminofluorane, the ingredient (b) was changed to 5.0 parts of 2,2-bis(4-hydroxyphenyl)hexafluoropropane and 10.0 parts of 1,1-bis(4-hydroxyphenyl)n-decane and the ingredient (c) was changed to 50.0 parts of capric acid-4-benzyloxyphenylethyl.

The reversible thermally color-changeable pigment B exhibited the color change behavior which began to develop a black color from −14° C. when cooled from a colorless state, exhibited a black color completely at −22° C., and began to lose color from at 32° C. when heated from this state and completely lost color to become colorless at 58° C. This color change behavior could be reproduced repeatedly.

The reversible thermally color-changeable pigment B was cooled to −22° C. or below in advance to completely develop color, and used as the coloring agent.

B. Creation of Ballpoint Pen

Multiple ink accommodating tubes of three types for a refill, in which a stainless steel tip supporting a ball having a diameter of 0.5 mm, 0.4 mm or 0.7 mm had been fixed in one end of a pipe made from PP were prepared.

And, as shown below, each ink accommodating tube was charged with the ink composition in each Example or Comparative Example, and further a backflow prevention member was charged by placing close to a back end side of the ink to obtain a refill for a ballpoint pen. And, each refill was incorporated in a barrel to prepare each of the following ballpoint pens with a cap or each retractable ballpoint pen.

<Ballpoint Pens with Cap (FIG. 1)>

1) For 0.5 mm Examples 1 to 3, 7 to 9, 13 to 16, 22 and 23, 32 and 33, 42 and 43

Comparative Examples 1 to 3, 9 and 10, 18 and 19, 25 and 26

2) For 0.4 mm Examples 21, 31 and 34, 41
Comparative Examples 8, 17, 24
3) For 0.7 mm Examples 24 to 28, 35 to 37, 44 to 47
Ink in Comparative Examples 11 to 14, 20 and 21, 27 to 30
<Retractable Ballpoint Pens (FIG. 2)>
1) For 0.4 mm Examples 4 to 6, 10 to 12, 17 to 20
Comparative Examples 4 to 7
2) For 0.7 mm Examples 29 and 30, 38 to 40, 48 to 50
Comparative Examples 15 and 16, 22 and 23, 31 and 32

Handwriting obtained by writing using a ballpoint pen accommodating the ink composition using the reversible thermally color-changeable pigment as the coloring agent can vanish using a rubbing tool such as a rubber made from SEBS.

C. The following dry up study was conducted for each ballpoint pen prepared above. At the same time, a change rate (x) of 40% evaporation viscosity was measured for each ink composition in Examples and Comparative Examples.

<Dry Up Resistance Study>

1) Ambient temperature atmosphere: The ballpoint pens with a cap and retractable ballpoint pens in Examples 1 to 20 and Comparative Examples 1 to 7 were left to stand in an inverted state (downward writing edge) at 25° C. for 60 days, and subsequently writing was conducted and the state of handwriting was visually observed.

2) Dryness facilitation atmosphere: The ballpoint pens with caps and the retractable ballpoint pens in Examples 21 to 50 and Comparative Examples 8 to 32 were left to stand in an inverted state (downward writing edge) at 50° C. for 30 days, and subsequently writing was conducted and the state of handwriting was visually observed.

For the ballpoint pen with a cap, the study was conducted in the state of the cap removed.

<Study Results and Discussion>

Results for Examples and Comparative Examples are shown in Tables 14 to 19 and Tables 20 to 23, respectively. Remarkable differences were observed as shown below.

Change rate of 40% evaporation viscosity: This value is unexceptionally "2.1" or more in Comparative Examples whereas the value is unexceptionally "0.7" or less in Examples.

Dry up resistance: The evaluation is unexceptionally ranked to "C" in Comparative Examples whereas it is unexceptionally ranked to "A" or "B" in Examples. In particular, the dry up resistance is excellent under the dryness facilitation atmosphere (50° C.) in Examples 21 to 50 in which the ionic substance was added.

It could be confirmed that in the ballpoint pen accommodating the ink composition in each Example, the ink viscosity was not excessively increased even when the water in the ink was evaporated, the dry up resistance is excellent, the initial start of writing and writing over time is good, and no blur in the handwriting occurred and stable writing performance could be sustained by combining the shear thinning viscosity-imparting agent with the particular thickening inhibitor.

TABLE 14

|  | Example | | | | | |
| --- | --- | --- | --- | --- | --- | --- |
|  | 1 | 2 | 3 | 4 | 5 | 6 |
| x Value | 0.2 | 0.1 | 0.1 | 0.1 | 0.2 | 0.7 |
| Dry up resistance study (25° C., 60 days) | B | A | A | A | B | B |

TABLE 15

|  | Example | | | | | | |
| --- | --- | --- | --- | --- | --- | --- | --- |
|  | 7 | 8 | 9 | 10 | 11 | 12 | 13 |
| x Value | 0.2 | 0.1 | 0.4 | 0.7 | 0.4 | 0.1 | 0.1 |
| Dry up resistance study (25° C., 60 days) | B | A | B | B | B | A | B |

TABLE 16

|  | Example | | | | | | |
| --- | --- | --- | --- | --- | --- | --- | --- |
|  | 14 | 15 | 16 | 17 | 18 | 19 | 20 |
| x Value | 0.2 | 0.1 | 0.2 | 0.1 | 0.1 | 0.1 | 0.1 |
| Dry up resistance study (25° C., 60 days) | B | B | B | A | A | A | A |

TABLE 17

|  | Example | | | | | | | | | |
| --- | --- | --- | --- | --- | --- | --- | --- | --- | --- | --- |
|  | 21 | 22 | 23 | 24 | 25 | 26 | 27 | 28 | 29 | 30 |
| x Value | 0.6 | 0.1 | 0.2 | 0.3 | 0.1 | 0.1 | 0.1 | 0.1 | 0.1 | 0.1 |
| Dry up resistance study (50° C., 30 days) | A | A | A | A | B | B | A | B | B | B |

TABLE 18

|  | Example | | | | | | | | | |
| --- | --- | --- | --- | --- | --- | --- | --- | --- | --- | --- |
|  | 31 | 32 | 33 | 34 | 35 | 36 | 37 | 38 | 39 | 40 |
| x Value | 0.2 | 0.7 | 0.4 | 0.2 | 0.1 | 0.1 | 0.1 | 0.1 | 0.1 | 0.1 |
| Dry up resistance study (50° C., 30 days) | A | A | A | B | B | A | B | B | B | B |

TABLE 19

|  | Example | | | | | | | | | |
| --- | --- | --- | --- | --- | --- | --- | --- | --- | --- | --- |
|  | 41 | 42 | 43 | 44 | 45 | 46 | 47 | 48 | 49 | 50 |
| x Value | 0.3 | 0.2 | 0.2 | 0.2 | 0.1 | 0.1 | 0.2 | 0.5 | 0.1 | 0.1 |
| Dry up resistance study (50° C., 30 days) | A | A | B | A | B | B | A | B | A | A |

TABLE 20

|  | Comparative Example | | | | | | |
| --- | --- | --- | --- | --- | --- | --- | --- |
|  | 1 | 2 | 3 | 4 | 5 | 6 | 7 |
| x Value | 2.8 | 2.5 | 2.7 | 2.7 | 2.9 | 5.2 | 2.4 |
| Dry up resistance study (25° C., 60 days) | C | C | C | C | C | C | C |

TABLE 21

|  | Comparative Example | | | | | | | | |
| --- | --- | --- | --- | --- | --- | --- | --- | --- | --- |
|  | 8 | 9 | 10 | 11 | 12 | 13 | 14 | 15 | 16 |
| x Value | 2.3 | 2.9 | 3.0 | 2.3 | 3.1 | 2.1 | 2.7 | 2.8 | 3.0 |
| Dry up resistance study (50° C., 30 days) | C | C | C | C | C | C | C | C | C |

TABLE 22

| | Comparative Example | | | | | | |
|---|---|---|---|---|---|---|---|
| | 17 | 18 | 19 | 20 | 21 | 22 | 23 |
| x Value | 2.6 | 2.1 | 2.1 | 2.3 | 2.4 | 2.1 | 2.1 |
| Dry up resistance study (50° C., 30 days) | C | C | C | C | C | C | C |

TABLE 23

| | Comparative Example | | | | | | | | |
|---|---|---|---|---|---|---|---|---|---|
| | 24 | 25 | 26 | 27 | 28 | 29 | 30 | 31 | 32 |
| x Value | 2.8 | 2.8 | 2.7 | 2.5 | 3.1 | 2.5 | 2.8 | 2.9 | 2.6 |
| Dry up resistance study (50° C., 30 days) | C | C | C | C | C | C | C | C | C |

Determination criteria in the above tables are as follows.
Dry up resistance study
A: Uniform good handwriting with no blur is obtained.
B: Handwriting with no blur is obtained.
C: Blur is observed in handwriting.

The invention claimed is:

1. A water-based ink composition for a ballpoint pen comprising a coloring agent dissolved or dispersed in an aqueous medium, a thickening inhibitor, and a shear thinning viscosity-imparting agent,
wherein said aqueous medium contains water-soluble organic solvent in an amount of less than about 1%,
wherein the thickening inhibitor is added together with the shear thinning viscosity-imparting agent,
wherein said thickening inhibitor is composed of at least one compound selected from a group of compounds having a polyoxyethylene group and/or a polyoxypropylene group, polyvinyl pyrrolidone having an average molecular weight in the range of about 8,000 to 3,000,000, polyvinyl alcohol and cellulose ether or derivatives thereof, and
wherein said sheer thinning viscosity-imparting agent is at about 0.1 to 5% by mass, said thickening inhibitor is about 0.5 to 15% by mass and a mixed mass ratio between said sheer thinning viscosity-imparting agent and said thickening inhibitor is about 1/1 to 1/30, and said water based ink composition has an enhanced dry-up resistance.

2. The water-based ink composition for the ballpoint pen according to claim 1, wherein said shear thinning viscosity-imparting agent is composed of at least one thickening polysaccharide selected from the group of xanthan gum, welan gum and succinoglycan.

3. A water-based ink composition for a ballpoint pen comprising a coloring agent dissolved or dispersed an aqueous medium, a thickening inhibitor, an iconic substance, and a shear thinning viscosity-imparting agent,
wherein said aqueous medium contains water-soluble organic solvent in an amount of less than about 1%,
wherein said thickening inhibitor and said ionic substance are added together with a shear thinning viscosity-imparting agent,
wherein said thickening inhibitor is composed of at least one compound selected from a group of compounds having a polyoxyethylene group and/or a polyoxypropylene group, polyvinyl pyrrolidone having an average molecular weight in the range of about 8,000 to 3,000,000, polyvinyl alcohol and cellulose ether or derivatives thereof, and
wherein said shear thinning viscosity-imparting agent is at about 0.1 to 5% by mass, said thickening inhibitor is about 0.5 to 15% by mass, and said iconic substance is about 3 to 10% by mass,
wherein a mixed mass ratio between said shear thinning viscosity-imparting agent and said thickening inhibitor is about 1/1 to 1/30, and a mixed mass ratio between said thickening inhibitor and said iconic substance is about 1/0.2 to 1/10, and
wherein said water-based ink composition has an enhanced dry-up resistance.

4. The water-based ink composition for the ballpoint pen according to claim 3, wherein said shear thinning viscosity-imparting agent is composed of one or more polysaccharides selected from the group of xanthan gum, welan gum and succinoglycan, and wherein said ionic substance is composed of one or more monovalent cation-supplying substances.

5. The water-based ink composition for the ballpoint pen according to claim 4, wherein a cation supplied by said monovalent cation-supplying substance is composed of one or more ions selected from the group of a sodium ion, a potassium ion or an ammonium ion.

6. A refill for a ballpoint pen comprising the water-based ink composition according to claim 1, wherein said water-based ink composition is filled in an ink holding member of the ballpoint pen.

7. A ballpoint pen comprising the refill according to claim 6, wherein said ballpoint pen is a retractable ballpoint pen, wherein a writing edge of the ballpoint pen refill is retracted and extruded from an opening at a front end of a barrel through a retractable mechanism.

8. A disposable ballpoint pen comprising the water-based ink composition according to claim 1, which is directly filled in a barrel of the ballpoint pen.

9. The water-based ink composition for the ballpoint pen according to claim 1, wherein said thickening inhibitor is composed of one or more compounds selected from the group of:
(a) compounds having the polyoxyethylene and/or the polyoxyproylene group, wherein the group is:
1) a PEG having a molecular weight of 300-20000;
2) a PPG having a molecular weight of 200-40000;
3) a PEG/PPG having a molecular weight of 1950-20000;
4) a PPG monoether having a molecular weight of 340-1500, a polyoxypropyleted glycerine, and a propoxyypropylated solbitol;
5) a 1,2-etylene oxide high polymer having a molecular weight of 20000-1000,000; or
6) a surfactant having a POE group having HLB of 10 or more;
(b) a PVAL having saponification degree of 71.0 or more;
(c) a polyvinyl pyrrolidone having a molecular weight of 8,000 to 3,000,000 and a K value of 33 or less; and
(d) a cellulose ether selected from hydroxypropylcellulose, carboxymethylcellulose and methylcellulose.

10. The water-based ink composition for the ballpoint pen according to claim 3, wherein said shear thinning viscosity-imparting agent is composed of at least one polysaccharide selected from the group of xanthan gum, welan gum and succinoglycan, and wherein said ionic substance is composed of one or more monovalent cation-supplying substances.

11. The water-based ink composition for the ballpoint pen according to claim 10, wherein a cation supplied by said monovalent cation-supplying substance is composed of at least one ion selected from the group of a sodium ion, a potassium ion, and an ammonium ion.

12. A refill for a ballpoint pen comprising the water-based ink composition according to claim 3, wherein said water-based ink composition is filled in an ink holding member of the ballpoint pen.

13. A ballpoint pen comprising a ballpoint pen refill according to claim 12, wherein the ballpoint pen in a retractable ballpoint pen, and a writing edge of the ballpoint pen refill is retracted and extruded from an opening at a front end of a barrel through a retractable mechanism.

14. A disposable ballpoint pen comprising the water-based ink composition according to claim 3, wherein the water-based ink composition is directly filled in a barrel of the ballpoint pen.

15. The water-based ink composition for the ballpoint pen according to claim 3, wherein said thickening inhibitor is composed of one or more compounds selected from the group of:

(a) compounds having the polyoxyethylene and/or the polyoxypropylene group, wherein the group is:
 1) a PEG having a molecular weight of 300-20000;
 2) a PPG having a molecular weight of 200-40000;
 3) a PEG/PPG having a molecular weight of 1950-20000;
 4) a PPG monoether having a molecular weight of 340-1500, a polyoxypropyleted glycerine, and a propoxyypropylated solbitol;
 5) a 1,2-etylene oxide high polymer having a molecular weight of 20000-1000,000; or
 6) a surfactant having a POE group having HLB of 10 or more;
(b) a PVAL having saponification degree of 71.0 or more;
(c) a polyvinyl pyrrolidone having a molecular weight of 8,000 to 3,000,000 and a K value of 33 or less; and
(d) a cellulose ether selected from hydroxyypropylcellulose, carboxymethylcellulose and methylcellulose.

* * * * *